(No Model.)
H. HOEFER.
BUTCHER'S OR BOW SAW.
No. 480,697. Patented Aug. 9, 1892.
FIG. 1.
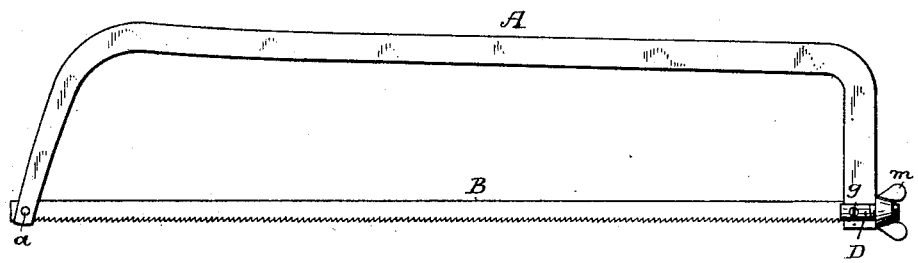
FIG. 2.
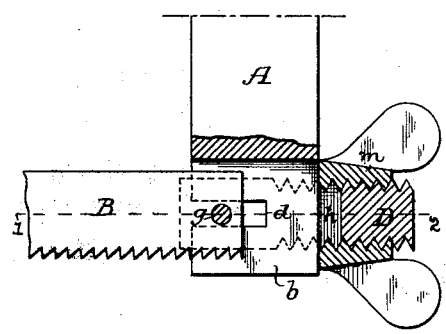
FIG. 3.
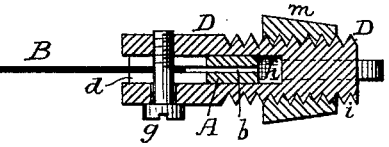
FIG. 5.
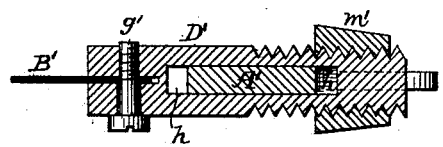
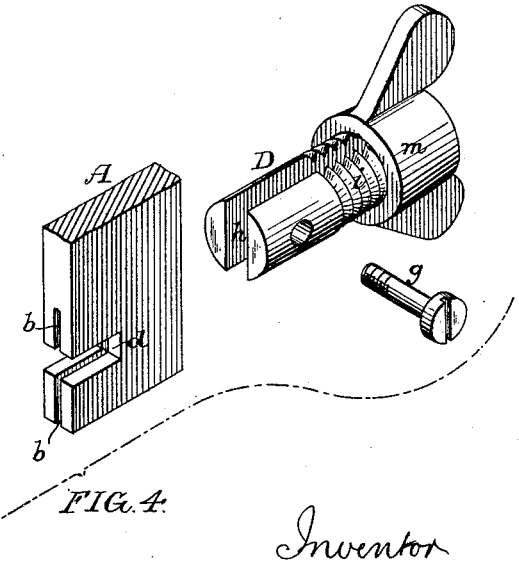
FIG. 4.
Witnesses:
R. Schleicher.
Frank Bechtold.
Inventor
Henry Hoefer
by his Attorneys
Howson & Howson
THE NORRIS PETERS CO., PHOTO-LITHO., WASHINGTON, D. C.

UNITED STATES PATENT OFFICE.

HENRY HOEFER, OF PHILADELPHIA, PENNSYLVANIA.

BUTCHER'S OR BOW SAW.

SPECIFICATION forming part of Letters Patent No. 480,697, dated August 9, 1892.

Application filed October 6, 1891. Serial No. 407,870. (No model.)

*To all whom it may concern:*

Be it known that I, HENRY HOEFER, a citizen of the United States, and a resident of Philadelphia, Pennsylvania, have invented certain Improvements in Butchers' or Bow Saws, of which the following is a specification.

The object of my invention is to so construct a butcher's or bow saw as to cheapen the manufacture of the same and yet provide for the secure and rigid retention of the ends of the blade. This object I attain in the manner hereinafter set forth, reference being had to the accompanying drawings, in which—

Figure 1 is a side view of sufficient of a butcher's saw to illustrate my invention. Fig. 2 is a longitudinal sectional view showing part of the metal frame of the saw, part of the blade, and the tightening and securing device for the latter. Fig. 3 is a sectional plan view on the line 1 2, Fig. 2. Fig. 4 is a detached perspective view illustrating part of the frame and blade of the saw and the tightening and securing device for said blade; and Fig. 5 is a view similar to Fig. 3, but illustrating a modification of my invention.

In Fig. 1, A represents the bowed metal frame of an ordinary butcher's saw, and B the blade of the same, the latter being secured at the outer end by a bolt $a$, which is adapted to the lower portion of the outer depending arm of the frame A, these parts being constructed as usual.

My invention relates to the securing device applied to the inner end of the blade and the lower end of the inner depending arm of the frame for the purpose not only of confining said inner end of the blade to the frame, but also for imparting tension to the blade, so as to keep it properly taut. In said inner depending arm of the frame A is formed a vertical slot $b$, extending upward from the bottom of the frame to an extent somewhat greater than the width of the blade, and in the front edge of this portion of the frame is formed a slot $d$, extending part way through the frame. The inner end of the saw-blade B enters the slot $b$, and is guided and laterally confined thereby, so that any twisting of this end of the blade is effectually prevented. Passing laterally through the slot $d$ and through an opening $f$ in the saw-blade near the end of the same is a screw-pin $g$, which is carried by a bolt D, slotted vertically as to its front portion, as at $h$, so as to embrace the frame A and threaded as to its outer portion, as at $i$, for the reception of a nut $m$, which bears against the outer face of the frame A, as shown in Figs. 1, 2, and 3. Upon tightening this nut $m$, therefore, outward pull is imparted to the bolt D, and the blade B of the saw is subjected to the proper tension. By this means not only is the blade securely attached and properly stretched, but the end of the blade is effectually prevented from twisting by reason of the confinement of said end of the blade in the slot $b$, and the necessity for forming an enlargement or eye upon the lower end of the inner depending arm of the frame A for the passage of the tightening-bolt is obviated, and the cost of making the frame is thereby materially reduced. In cases where it is not necessary to guard against twisting of the inner end of the blade so effectually, as is provided for in the construction shown, the blade may terminate in advance of the inner depending arm of the frame A, and the bolt D may project forward beyond said frame for attachment to the blade, in which case the slots in the lower end of the arm of the frame A will be unnecessary. Such construction is illustrated in Fig. 5, but I may say that the construction shown in Figs. 1 to 4 is always to be preferred.

The parts which in Figs. 1 to 4 are represented by the letters A, B, D, $g$, and $m$ are in the modified construction (shown in Fig. 5) represented, respectively, by the letters A', B', D', $g'$, and $m'$.

Having thus described my invention, I claim and desire to secure by Letters Patent—

1. The combination of the frame and blade of a butcher's or bow saw, with a slotted screw-bolt embracing said frame and connected to the blade, and a nut adapted to said bolt and bearing upon the outer face of the frame, substantially as specified.

2. The combination of the frame of a butcher's or bow saw, having vertical and transverse slots at its lower end, with the blade guided in said vertical slot, a slotted screw-bolt embracing the frame and having a transverse pin adapted to the transverse slot of the frame and engaging with the blade, and a nut adapted to said bolt and bearing upon the outer face of the frame, substantially as specified.

3. The combination of the frame of the saw, the blade, a slotted screw-bolt embracing the frame, a screw-pin passing through said bolt and through an opening in the blade of the saw, and a nut adapted to the bolt and bearing against the outer face of the frame, substantially as specified.

In testimony whereof I have signed my name to this specification in the presence of two subscribing witnesses.

HENRY HOEFER.

Witnesses:
EUGENE ELTERICH,
HARRY SMITH.